(12) United States Patent
Chou

(10) Patent No.: US 9,435,331 B2
(45) Date of Patent: Sep. 6, 2016

(54) AIR COMPRESSOR HAVING ENLARGED COMPARTMENT FOR RECEIVING PRESSURIZED AIR

(71) Applicant: Wen San Chou, Tainan (TW)

(72) Inventor: Wen San Chou, Tainan (TW)

( * ) Notice: Subject to any disclaimer, the term of this patent is extended or adjusted under 35 U.S.C. 154(b) by 260 days.

(21) Appl. No.: 14/050,568

(22) Filed: Oct. 10, 2013

(65) Prior Publication Data

US 2014/0134025 A1 May 15, 2014

(30) Foreign Application Priority Data

Nov. 14, 2012 (TW) .............................. 101142526 A

(51) Int. Cl.
*F04B 39/12* (2006.01)
*F16J 12/00* (2006.01)

(52) U.S. Cl.
CPC ........... *F04B 39/125* (2013.01); *F04B 39/122* (2013.01); *F04B 39/127* (2013.01); *F16J 12/00* (2013.01)

(58) Field of Classification Search
CPC .. F04B 39/122; F04B 39/125; F04B 39/127; F04B 39/1073; F04B 35/04; F04B 41/02; F16J 12/00; F15B 15/1428
USPC ....................................................... 92/169.1
See application file for complete search history.

(56) References Cited

U.S. PATENT DOCUMENTS

| | | | |
|---|---|---|---|
| 6,213,725 B1 | 4/2001 | Chou | |
| 6,514,058 B1 | 2/2003 | Chou | |
| 6,655,928 B2 | 12/2003 | Chou | |
| 6,846,162 B2 | 1/2005 | Chou | |
| 7,240,642 B2 | 7/2007 | Chou | |
| 7,462,018 B2 | 12/2008 | Chou | |
| 2010/0046862 A1* | 2/2010 | Schubert | F04B 35/045 384/12 |
| 2012/0121443 A1* | 5/2012 | Chou | F04B 35/04 417/297 |

* cited by examiner

*Primary Examiner* — Devon Kramer
*Assistant Examiner* — Christopher Brunjes

(57) ABSTRACT

An air compressor device includes a cylinder housing and a supporting plate, a piston engaged in the cylinder housing and moved by a motor, the cylinder housing includes a partition for separating the cylinder housing into an upper compartment and a lower chamber, and a passage formed in the partition for allowing the pressurized air to flow from the chamber into the compartment of the cylinder housing, the compartment of the cylinder housing includes an inner diameter (D) greater than an inner diameter (d) of the chamber of the cylinder housing for allowing the pressurized air in the chamber to easily flow into the compartment of the cylinder housing with a relatively decreased pressure.

9 Claims, 6 Drawing Sheets

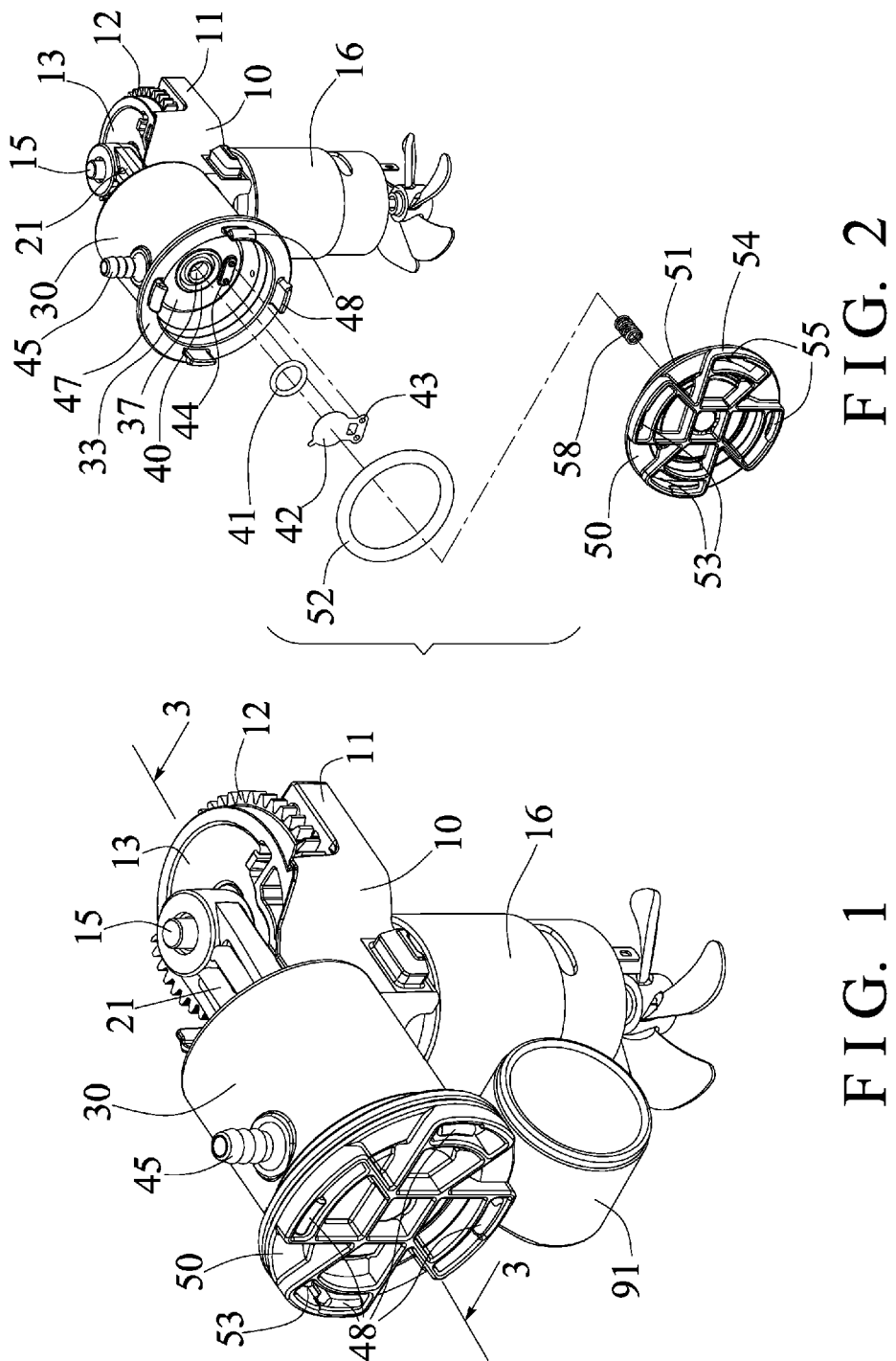

AIR COMPRESSOR HAVING ENLARGED COMPARTMENT FOR RECEIVING PRESSURIZED AIR

BACKGROUND OF THE INVENTION

1. Field of the Invention

The present invention relates to an air compressor device, and more particularly to an air compressor device including an enlarged receptacle or compartment having a relatively increased inner diameter or size or volume or dimension or standard for storing the pressurized air and for allowing the piston to be moved relative to the cylinder housing in the reciprocating action with a relatively decreased or reduced resisting force and for suitably increasing the pumping function or effect for the air compressor device.

2. Description of the Prior Art

Typical air compressors comprise a cylinder housing attached or secured to a base and having a piston slidably disposed therein, and a motor secured to the base and coupled to the piston of the cylinder housing for actuating or driving the piston of the cylinder housing in a reciprocating action, in order to generate a pressurized air of a greater air pressure and a decreased flowing quantity and for supplying the pressurized air to inflate various air facilities, such as tires, air beds, air cushions, hovercrafts, etc.

The cylinder housing normally includes an outlet receptacle having a compartment formed therein and having one or more outlet ports communicative with the compartment of the outlet receptacle for selectively or changeably attaching and securing or coupling various parts or elements or attachments or facilities, such as the pressure gauges, the air nozzles, the relief valves, the safety valves or the like.

The applicant has developed various kinds of typical air compressors, including at least U.S. Pat. No. 6,213,725 to Chou, U.S. Pat. No. 6,514,058 to Chou, U.S. Pat. No. 6,655,928 to Chou, U.S. Pat. No. 6,846,162 to Chou, U.S. Pat. No. 7,240,642 to Chou, and U.S. Pat. No. 7,462,018 to Chou each of which also comprise a piston slidably disposed within a cylinder housing, a spring valve having one end secured to the piston and having the other end for selectively blocking an air aperture of the piston, in order to control the air to flow through the piston, and a motor secured to the base and coupled to the piston of the cylinder housing with a gearing mechanism for actuating or driving or forcing the piston of the cylinder housing to move in the reciprocating action relative to the cylinder housing, and an outlet receptacle extended or formed on top of the cylinder housing and having a compartment formed therein for receiving the pressurized air from the cylinder housing and having one or more outlet ports communicative with the compartment of the outlet receptacle for selectively or changeably attaching and securing or coupling various parts or elements or attachments or facilities, such as the pressure gauges, the air nozzles, the relief valves, the safety valves or the like.

However, the compartment of the outlet receptacle at the outlet portion of the cylinder housing normally includes an inner diameter or size or volume or dimension or standard smaller than that of the pumping chamber within the cylinder housing, and the pressurized air contained in the compartment of the outlet receptacle may apply a resisting force onto or against the movement of the piston relatively and may greatly decrease or reduce the moving speed of the piston, and thus may greatly decrease or reduce the pumping effect or function of the air compressor device.

The present invention has arisen to mitigate and/or obviate the afore-described disadvantages of the conventional structures for the air compressors.

SUMMARY OF THE INVENTION

The primary objective of the present invention is to provide an air compressor device including an enlarged receptacle or compartment having a relatively increased inner diameter or size or volume or dimension or standard for storing the pressurized air and for allowing the piston to be moved relative to the cylinder housing in the reciprocating action with a relatively decreased or reduced resisting force and for suitably increasing the pumping function or effect for the air compressor device.

In accordance with one aspect of the invention, there is provided an air compressor device comprising a supporting base, which includes a supporting plate, and a cylinder housing, the cylinder housing including a chamber formed therein, a piston slidably received in the chamber of the cylinder housing and provided with a piston rod extended from the piston, and a motor attached to the supporting plate for moving the piston rod relative to the cylinder housing in a reciprocating action and for generating pressurized air, and the cylinder housing including a partition formed in a middle portion of the cylinder housing for defining an upper wall for the chamber of the cylinder housing, and including a compartment formed in an upper portion of the cylinder housing and separated from the chamber of the cylinder housing with the partition, and including a passage formed in the partition and communicating with the chamber and the compartment of the cylinder housing for allowing the pressurized air to flow from the chamber into the compartment of the cylinder housing, the compartment of the cylinder housing including an inner diameter (D) greater than an inner diameter (d) of the chamber of the cylinder housing for allowing the pressurized air in the chamber of the cylinder housing to easily flow into the compartment of the cylinder housing with a relatively decreased pressure and for preventing the pressurized air in the compartment of the cylinder housing from applying a resisting force onto or against the movement of the piston, which decreases or reduces the moving speed of the piston, and thus for allowing the pumping effect or function of the piston of the air compressor device to be suitably increased or facilitated.

The cylinder housing includes a peripheral wall and an inner peripheral fence which is formed integrally with the peripheral wall at a bottom of the cylinder housing, at which the chamber of the cylinder housing opens onto ambient environment, for defining the chamber within the inner peripheral fence, the compartment within the peripheral wall and above the partition, and an annular channel between the peripheral wall and the inner peripheral fence, wherein the annular channel extends upwardly from the bottom of the cylinder housing to communicate with the compartment of the cylinder housing.

The cylinder housing includes a spring blade attached to the partition for selectively opening and blocking the passage of the partition and for forming as a check valve device. The spring blade includes one end portion attached to the partition with at least one catch for allowing the spring blade to selectively open and block the passage of the partition and to control or to limit the pressurized air to flow from the chamber into the compartment of the cylinder housing.

The cylinder housing includes a peripheral recess formed in the partition for receiving and engaging with a sealing ring which is capable of contacting and engaging with the spring blade. The cylinder housing is attached with a cover for enclosing the compartment of the cylinder housing, and is provided with a spring biasing member engaged between the cover and the spring blade for applying a spring biasing force onto the spring blade.

The cover includes a tube extended from the cover for receiving therein the spring biasing member, so that the spring biasing member is anchored or positioned to the cover. The cylinder housing includes at least one catch extended therefrom for engaging with the cover and for detachably attaching the cover to the cylinder housing.

The cover includes at least one opening formed therein for receiving and engaging with the at least one catch of the cylinder housing. The cylinder housing includes an outwardly extended peripheral flange, and the at least one catch is extended from the peripheral flange.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 1 is a perspective view of an air compressor device in accordance with the present invention;

FIG. 2 is a partial exploded view of the air compressor device;

DETAILED DESCRIPTION OF THE PREFERRED EMBODIMENT

Figure 3:
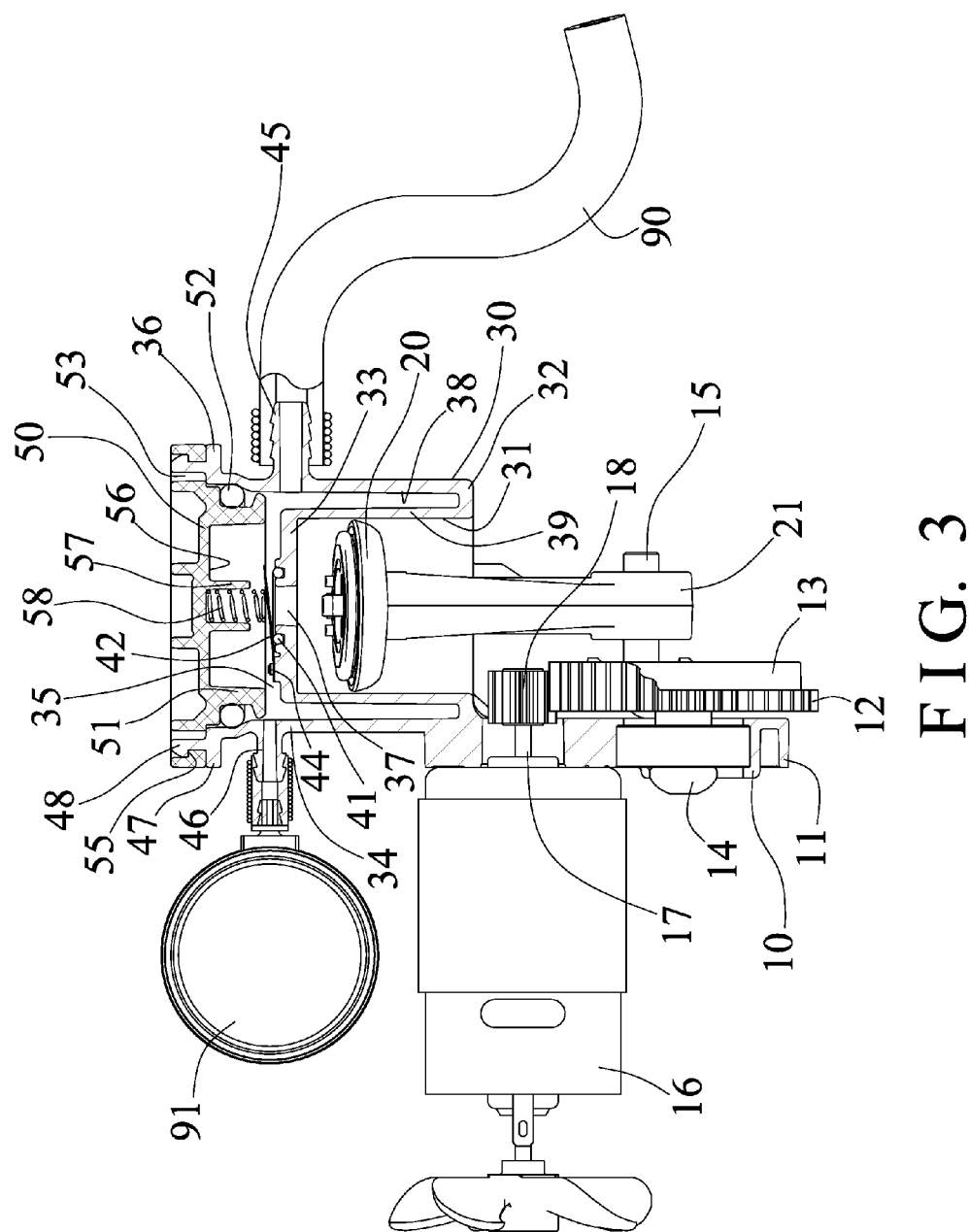
FIG. 3 is a partial cross sectional view of the air compressor device, taken along lines 3-3 of FIG. 1.

Referring to the drawings, and initially to FIGS. 1-4, an air compressor device in accordance with the present invention comprises a supporting base 10 including a supporting plate 11, and a cylinder housing 30 provided on or extended from the supporting plate 11 and preferably, but not necessarily formed integral with the supporting plate 11. For example, the supporting plate 11 and the cylinder housing 30 may be formed integral with each other, as shown in FIGS. 3-4 and 8-9, with the molding or mold-injection processes, for example, or alternatively, the cylinder housing 30 may include one or more projections (not shown) extended therefrom and engaged with corresponding hubs or tubular members (not shown) of the supporting plate 11 for detachably attaching or mounting or securing the cylinder housing 30 to the supporting plate 11.

The cylinder housing 30 includes a chamber 31 formed therein and opened downwardly for slidably receiving or engaging with a piston 20 therein (FIGS. 3, 8-9); the piston 20 is provided with an extension or piston rod 21 extended therefrom and is slidable in a reciprocating action in the chamber 31 of the cylinder housing 30 for generating pressurized air. As also best shown in FIGS. 3 and 8-9, a gear 12 and an eccentric member 13 are rotatably attached to the lower portion of the supporting plate 11 with one or more bearings (not shown) and a shaft 14 and rotated in concert with each other relative to the supporting plate 11, and the eccentric member 13 is provided with a crank pin or an eccentric pin 15 extended therefrom (also in FIGS. 1, 2) and pivotally connected to the free end portion of the piston rod 21 of the piston 20 in order to actuate or to move the piston 20 relative to and along the cylinder housing 30 in the reciprocating actions.

A motor 16 may be attached or secured to the upper portion of the supporting plate 11 with such as latches or pins or catches or fasteners (not shown), and the motor 16 includes a spindle 17 rotatably extended through the supporting plate 11, and includes a pinion 18 attached or mounted or secured to the spindle 17 thereof. As shown, the pinion 18 of the motor 16 is meshed or engaged with the gear 12 for allowing the gear 12 to be rotated or driven by the motor 16 with the pinion 18, and thus for allowing the piston 20 to be actuated to move along or relative to the cylinder housing 30 in the reciprocating actions by the eccentric member 13 and the eccentric pin 15.

The cylinder housing 30 includes a partition 33 formed in the middle or intermediate portion 34 thereof for forming or defining the upper wall 33 for the chamber 31 of the cylinder housing 30, and includes a compartment 35 formed in the upper portion 36 thereof and spaced or separated from the chamber 31 of the cylinder housing 30 with the partition 33, and includes an orifice or aperture or opening or passage 37 formed in the partition 33 and communicating with the chamber 31 and the compartment 35 of the cylinder housing 30 for allowing the pressurized air to flow from the chamber 31 into the compartment 35 of the cylinder housing 30. The cylinder housing 30 includes an inner peripheral fence 39 formed integrally with the peripheral wall 32 at a bottom (A) of the cylinder housing 30, at which the chamber 31 opens onto ambient environment. Thus, an annular channel 38 is defined between the inner peripheral fence 39 and the peripheral wall 32, wherein the annular channel 38 extends upwardly from the bottom (A) of the cylinder housing 30 to communicate with the compartment 35 of the cylinder housing 30. The annular channel 38 extends at a distance substantially equal to the distance between the partition 33 of the cylinder housing 30 and the bottom (A) of the cylinder housing 30.

Figure 5:
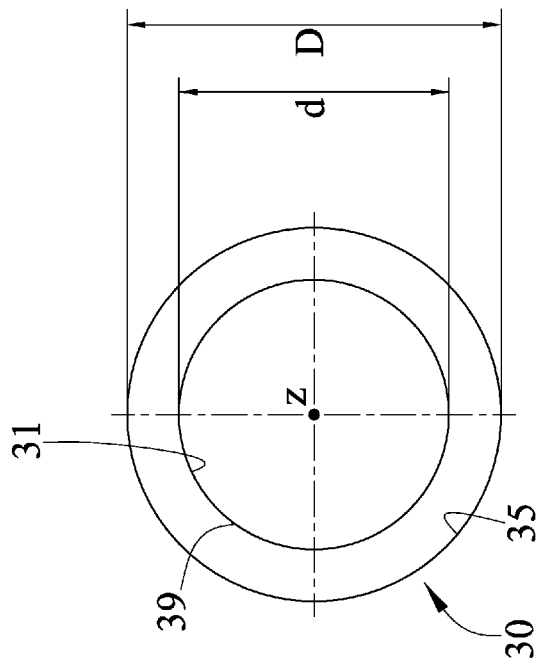
FIG. 5 is a partial plan schematic view illustrating the inner diameters of the pumping chamber within the cylinder housing and of the pressurized air containing compartment within the outlet receptacle of the air compressor device.
Figure 4:
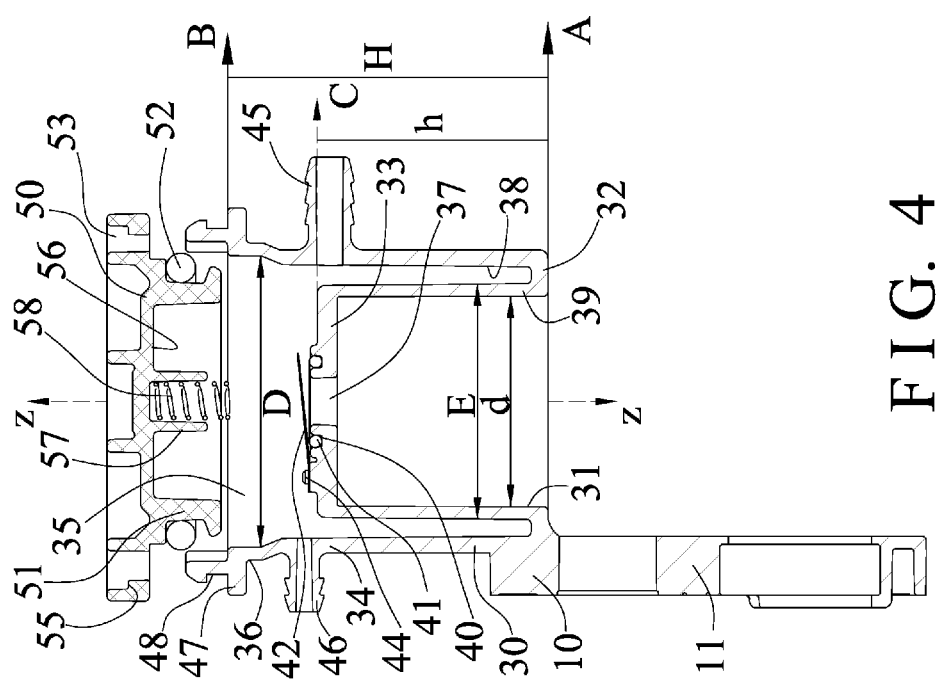
FIG. 4 is another partial cross sectional view similar to FIG. 3, illustrating a supporting base and a cylinder housing of the air compressor device, in which the other parts or elements of the air compressor device have been removed or deleted for showing the inner structure of the supporting base and the cylinder housing of the air compressor device.

As best shown in FIGS. 4 and 5, the compartment 35 of the cylinder housing 30 includes an inner diameter (D) greater than the inner diameter (d) of the chamber 31 of the cylinder housing 30 for allowing the compartment 35 of the cylinder housing 30 to have a relatively increased inner diameter or size or volume or dimension or standard than that of the chamber 31 of the cylinder housing 30, and thus for allowing the pressurized air in the chamber 31 of the cylinder housing 30 to easily flow into the compartment 35 of the cylinder housing 30 without much resistance, and/or for preventing the pressurized air received or contained in the compartment 35 of the cylinder housing 30 from applying a resisting force onto or against the movement of the piston 20, which decreases or reduces the moving speed of the piston 20, and thus for allowing the pumping effect or function of the piston 20 of the air compressor device to be suitably increased or facilitated.

As also shown in FIG. 4, the distance or height (H) between the base or bottom (A) of the cylinder housing 30 and the upper portion (B) of the compartment 35 of the cylinder housing 30 is greater than the distance or height (h) between the base or bottom (A) of the cylinder housing 30 and the upper portion (C) of the chamber 31 or the partition 33 of the cylinder housing 30. The chamber 31 and the compartment 35 and the annular channel 38 and the inner peripheral fence 39 of the cylinder housing 30 are concentric with each other and include a center (Z, FIG. 5) located at the Z-Z axis (FIG. 4). The annular channel 38, which extends upwardly in the direction of the Z-Z axis, has an extension length substantially equal to the distance (h) between the bottom (A) and the partition 33 of the cylinder housing 30. The inner peripheral fence 39 of the cylinder housing 30 may include an outer diameter (E) greater than the inner diameter (d) of the chamber 31 of the cylinder housing 30, but smaller than the inner diameter (D) of the compartment 35 of the cylinder housing 30.

The cylinder housing 30 includes a circular or peripheral recess 40 (FIGS. 2, 4) formed in the upper portion of the partition 33 for receiving or engaging with a sealing ring 41, and includes a spring blade 42 having one end portion 43 attached or mounted or secured to the partition 33 with such as latches or pins or fasteners or catches 44, and arranged for allowing the spring blade 42 to open or block the passage 37 of the partition 33 and to form as a check valve device 42. For example, the spring blade 42 may be moved to contact or engage with the partition 33 and the sealing ring 41 (FIG. 8) in order to block the passage 37 of the partition 33, and may also be disengaged from the partition 33 and the sealing ring 41 (FIGS. 3-4, 9) for allowing the pressurized air to flow from the chamber 31 into the compartment 35 of the cylinder housing 30.

The cylinder housing 30 includes one or more ducts 45, 46 (FIGS. 1-4 and 8-9) extended outwardly therefrom and communicating with the annular channel 38 and/or the compartment 35 of the cylinder housing 30 for receiving the pressurized air from the annular channel 38 and/or the compartment 35 of the cylinder housing 30. The ducts 45, 46 may be coupled to various kinds of equipment that require pressurized air, such as a nozzle (not shown) with a hose 90, a cap or lid, spring-biased check valve, relief valve, safety valve, pressure gauge 91 or the like, wherein those pieces of equipment are typical and are not related to the present invention and will not be described in further details.

The cylinder housing 30 further includes a peripheral rib or rim or flange 47 extended radially and outwardly from the upper portion 36 thereof, and includes one or more pins or fasteners or tongues or latches or catches 48 extended from the peripheral flange 47 or the upper portion 36 of the cylinder housing 30, such as extended axially and outwardly from the peripheral flange 47 or the upper portion 36 of the cylinder housing 30 for detachably attaching or mounting or securing a cover 50 to the cylinder housing 30 and for blocking or enclosing the compartment 35 of the cylinder housing 30. For example, the cover 50 includes a peripheral wall or fence or member 51 slidably received or engaged in the compartment 35 of the cylinder housing 30, and a gasket or sealing ring 52 is disposed or engaged between the peripheral member 51 of the cover 50 and the cylinder housing 30 for making a water or fluid or air tight seal between the peripheral member 51 of the cover 50 and the cylinder housing 30.

Figure 7:
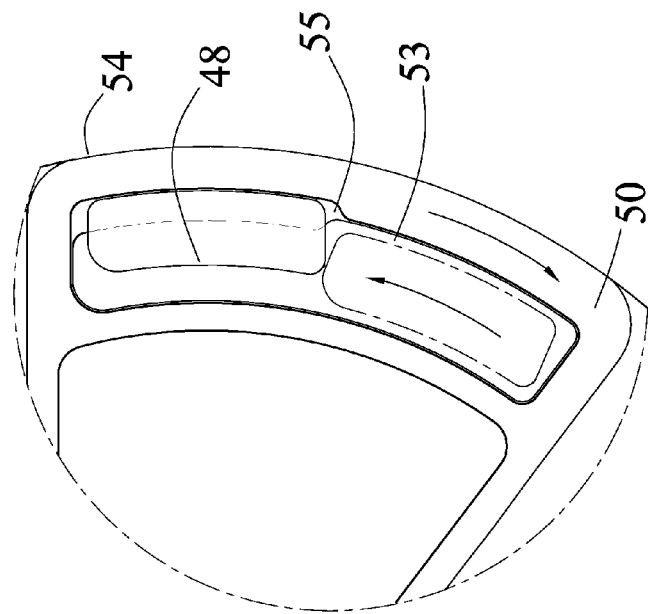
FIG. 7 is an enlarged partial plan schematic view of the air compressor device.
Figure 6:
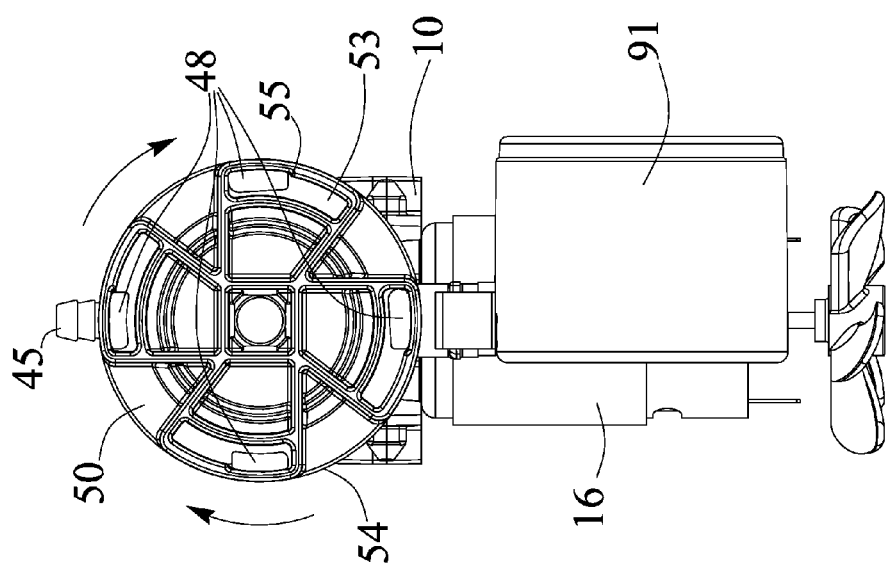
FIG. 6 is a side plan schematic view of the air compressor device.

The cover 50 further includes one or more passages or orifices or apertures or openings 53 formed therein, such as formed in the outer peripheral portion 54 thereof for selectively and slidably receiving or engaging with the catches 48 of the cylinder housing 30, and includes one or more pins or fasteners or tongues or catches or latches 55 formed or provided in or beneath or beside the openings 53 of the cover 50 for contacting or engaging with the catches 48 of the cylinder housing 30 and for detachably attaching or mounting or securing the cover 50 to the cylinder housing 30 when the cover 50 is pivoted or rotated relative to the cylinder housing 30 (FIGS. 6, 7), for example. The cover 50 further includes a chamber or compartment or space 56 formed therein, such as formed in the peripheral member 51 and communicating with the compartment 35 of the cylinder housing 30 for containing or receiving the pressurized air.

The cover 50 further includes a conduit or duct or cylinder member or tube 57 extended into the space 56 of the cover 50 for receiving therein a spring biasing member 58 which is disposed or contacted or engaged between the cover 50 and the spring blade 42 for applying a resisting or spring biasing force onto or against the spring blade 42, wherein the spring biasing member 58 is a coil spring which has a diameter substantially equal to an internal diameter of the tube 57, the spring biasing member 58 is inserted in the tube 57 more than half of its length, and a distal end of the spring biasing member 58 extends out of the tube 57 to engage with the spring blade 42, and thus for allowing the pressurized air in the chamber 31 of the cylinder housing 30 to flow into the compartment 35 of the cylinder housing 30 only when the pressurized air in the chamber 31 of the cylinder housing 30 overcome the spring biasing force of the spring biasing member 58 and/or of the spring blade 42. The spring biasing member 58 may be selected from a predetermined size or dimension or standard having a predetermined or selected spring biasing force for applying to the spring blade 42.

Figure 8:
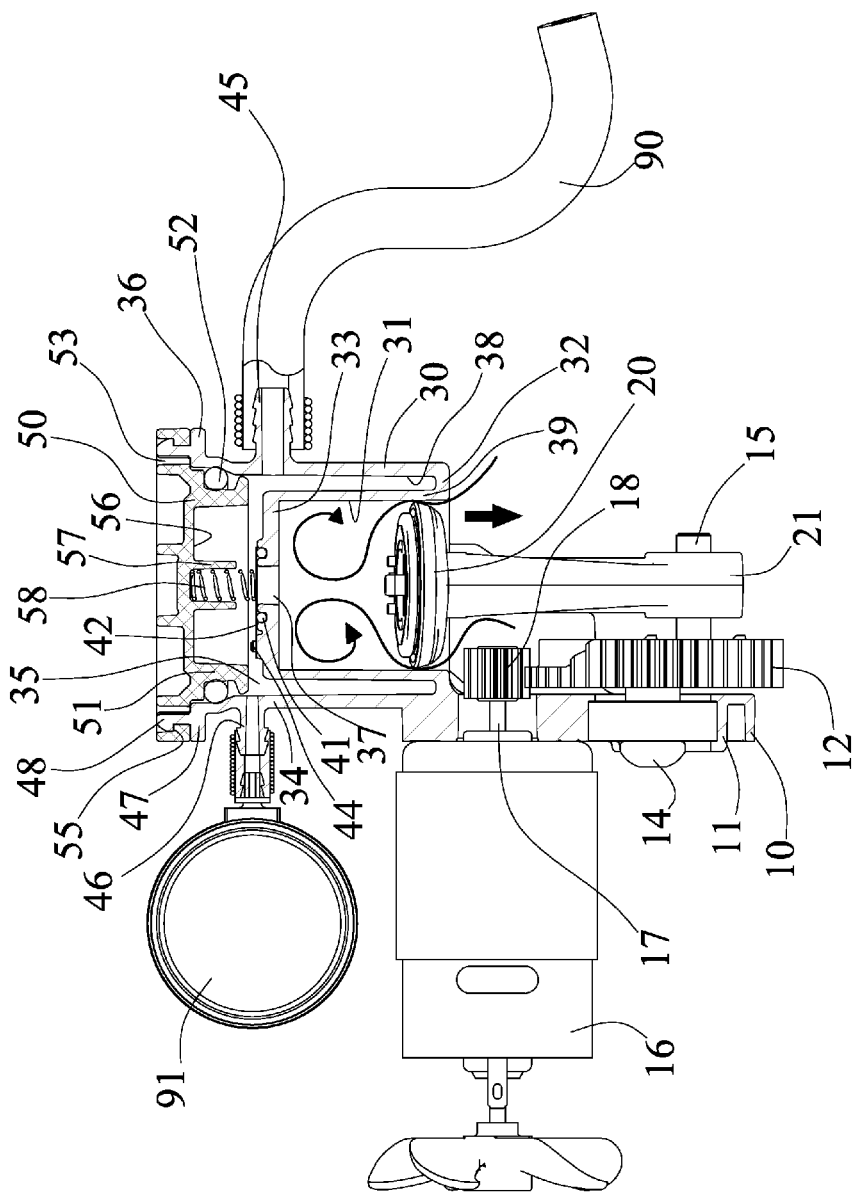
FIGS. 8, 9 are partial cross sectional views similar to FIG. 3, illustrating the operation of the air compressor device.
Figure 9:
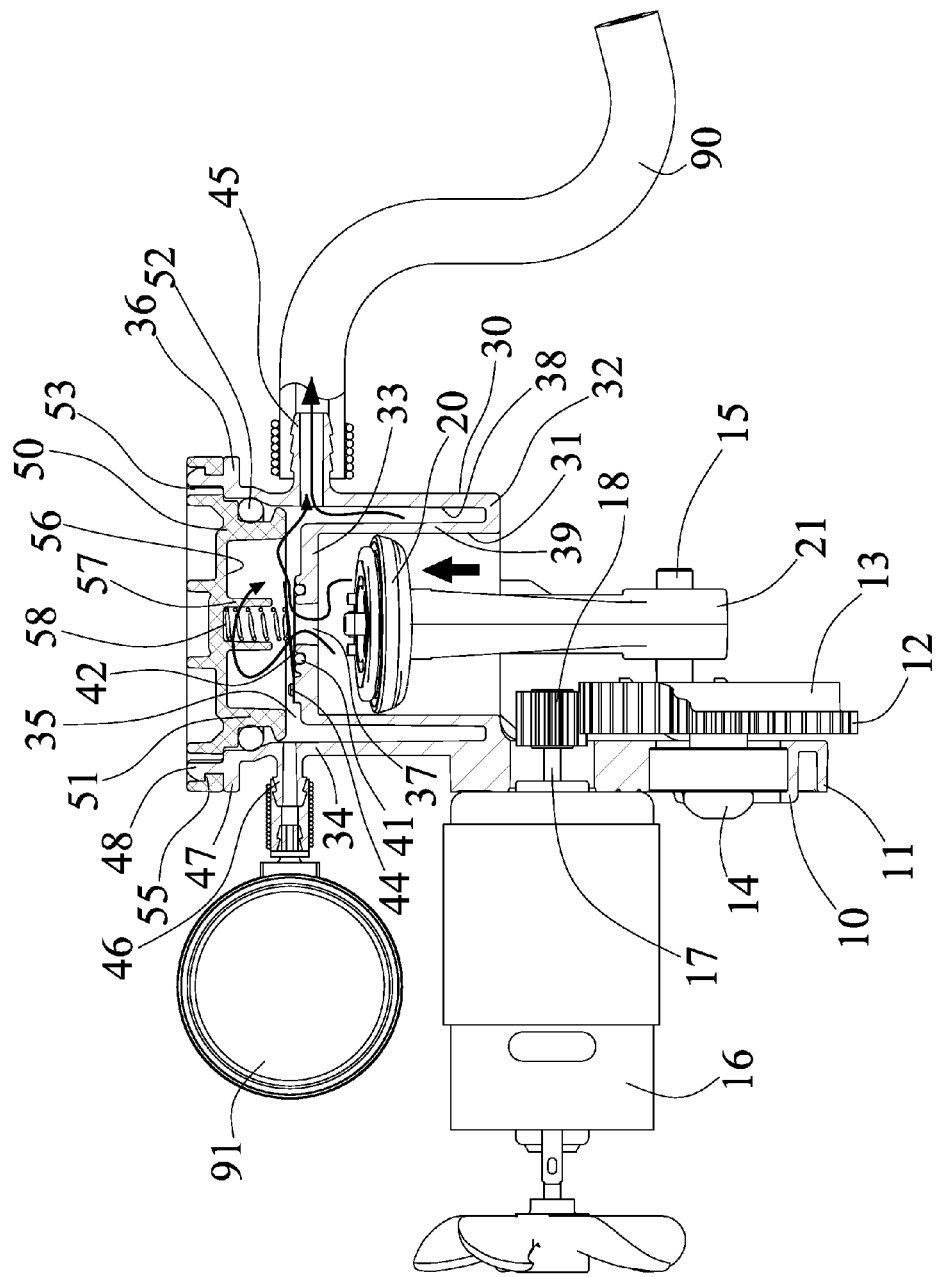

In operation, as shown in FIG. 8, the piston 20 may be actuated or moved relative to the cylinder housing 30 and away from the partition 33 in the returning stroke for allowing the air to flow from the outer environment into the chamber 31 of the cylinder housing 30, at this moment, the spring blade 42 may be biased to block or enclose the passage 37 of the partition 33 by the spring biasing member 58 or by the vacuuming or reduced pressure in the chamber 31 of the cylinder housing 30. As shown in FIG. 9, when the piston 20 is actuated or moved toward the partition 33 in the working or pumping stroke, an amount of pressurized air may be generated or formed by the piston 20 and may overcome the spring biasing force of the spring biasing member 58 and/or of the spring blade 42 and may thus flow into the compartment 35 of the cylinder housing 30.

It is to be noted that the compartment 35 of the cylinder housing 30 includes an inner diameter (D) greater than the inner diameter (d) of the chamber 31 of the cylinder housing 30 for allowing the compartment 35 of the cylinder housing 30 to have a relatively increased inner diameter or size or volume or dimension or standard than that of the chamber 31 of the cylinder housing 30, and thus for allowing the pressurized air in the chamber 31 of the cylinder housing 30 to easily flow into the compartment 35 of the cylinder housing 30 without much resistance, and/or for preventing the pressurized air received or contained in the compartment 35 of the cylinder housing 30 from applying a great resisting force onto or against the movement of the piston 20, and thus for allowing the pumping effect or function of the piston 20 of the air compressor device to be suitably increased or facilitated.

Accordingly, the air compressor device in accordance with the present invention includes an enlarged receptacle or compartment having a relatively increased inner diameter or size or volume or dimension or standard for storing the pressurized air and for allowing the piston to be moved relative to the cylinder housing in the reciprocating action with a relatively decreased or reduced resisting force and for suitably increasing the pumping function or effect for the air compressor device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An air compressor device comprising:
a supporting base including a supporting plate,
a cylinder housing defining therein a chamber and provided at said supporting base,
a piston slidably received in said chamber of said cylinder housing and provided with a piston rod extended from said piston, and
a motor attached to said supporting plate for moving said piston rod relative to said cylinder housing in a reciprocating action and for generating pressurized air, and
said cylinder housing including a partition formed in a middle portion of said cylinder housing for defining an upper wall for said chamber of said cylinder housing, and including a compartment formed in an upper portion of said cylinder housing and separated from said chamber of said cylinder housing with said partition, and including a passage formed in said partition and communicating with said chamber and said compartment of said cylinder housing for allowing the pressurized air to flow from said chamber into said compartment of said cylinder housing, said compartment of said cylinder housing including an inner diameter (D) greater than an inner diameter (d) of said chamber of said cylinder housing for allowing the pressurized air in said chamber of said cylinder housing to easily flow into said compartment of said cylinder housing, said cylinder housing including a peripheral wall and an inner peripheral fence which is formed integrally with said peripheral wall at a bottom of said cylinder housing, at which said chamber of said cylinder housing opens into an ambient environment, for defining said chamber within said inner peripheral fence, said compartment within said peripheral wall and above said partition, and an annular channel between said peripheral wall and said inner peripheral fence, said annular channel extending upwardly from said bottom of said cylinder housing to communicate with said compartment of said cylinder housing, wherein said annular channel extends at a distance substantially equal to the distance between said partition of said cylinder housing and said bottom of said cylinder housing.

2. The air compressor device as claimed in claim 1, wherein said cylinder housing includes a spring blade attached to said partition for selectively opening and blocking said passage of said partition and for forming as a check valve device.

3. The air compressor device as claimed in claim 2, wherein said spring blade includes one end portion attached to said partition with at least one catch for allowing said spring blade to selectively open and block said passage of said partition.

4. The air compressor device as claimed in claim 2, wherein said cylinder housing includes a peripheral recess formed in said partition for receiving and engaging with a sealing ring which is capable of contacting and engaging with said spring blade.

5. The air compressor device as claimed in claim 2, wherein said cylinder housing is attached with a cover for enclosing said compartment of said cylinder housing, and is provided with a spring biasing member engaged between said cover and said spring blade for applying a spring biasing force onto said spring blade.

6. The air compressor device as claimed in claim 5, wherein said cover is provided with a tube extended from said cover for receiving therein said spring biasing member, wherein said spring biasing member is a coil spring which has a diameter substantially equal to an internal diameter of said tube, said spring biasing member is inserted in said tube more than half of its length, and a distal end of said spring biasing member extends out of said tube to engage with said spring blade.

7. The air compressor device as claimed in claim 5, wherein said cylinder housing is provided with at least one catch for engaging with said cover and for detachably attaching said cover to said cylinder housing.

8. The air compressor device as claimed in claim 7, wherein said cover includes at least one opening formed therein for receiving and engaging with said at least one catch of said cylinder housing.

9. The air compressor device as claimed in claim 7, wherein said cylinder housing includes an outwardly extended peripheral flange, and said at least one catch is extended from said peripheral flange.

* * * * *